(12) United States Patent
Arisawa et al.

(10) Patent No.: US 9,929,637 B2
(45) Date of Patent: Mar. 27, 2018

(54) POWER CONVERTING DEVICE

(71) Applicant: Mitsubishi Electric Corporation, Tokyo (JP)

(72) Inventors: Koichi Arisawa, Tokyo (JP); Takashi Yamakawa, Tokyo (JP); Yuji Takayama, Tokyo (JP); Shigeo Umehara, Tokyo (JP); Tomomi Higashikawa, Tokyo (JP); Makoto Tanikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/508,204

(22) PCT Filed: Sep. 26, 2014

(86) PCT No.: PCT/JP2014/075676
§ 371 (c)(1),
(2) Date: Mar. 2, 2017

(87) PCT Pub. No.: WO2016/046968
PCT Pub. Date: Mar. 31, 2016

(65) Prior Publication Data
US 2017/0288527 A1   Oct. 5, 2017

(51) Int. Cl.
*H02M 7/06* (2006.01)
*H02M 1/12* (2006.01)
(Continued)

(52) U.S. Cl.
CPC ............... *H02M 1/12* (2013.01); *H02M 1/08* (2013.01); *H02M 7/06* (2013.01); *H02M 2001/0048* (2013.01)

(58) Field of Classification Search
CPC ............ H02M 1/08; H02M 1/12; H02M 1/42; H02M 1/4208; H02M 7/06; H02M 7/066; H02M 7/08; H02M 2001/4283
See application file for complete search history.

(56) References Cited

U.S. PATENT DOCUMENTS 6,751,105 B2   6/2004   Yamanaka et al.
8,508,195 B2   8/2013   Uno
(Continued)

FOREIGN PATENT DOCUMENTS

JP   S58-192466 A   11/1983
JP   07-089743 B2   9/1995
(Continued)

OTHER PUBLICATIONS

International Search Report of the International Searching Authority dated Dec. 9, 2014 for the corresponding international application No. PCT/JP2014/075676 (and English translation).
(Continued)

*Primary Examiner* — Gary L Laxton
(74) *Attorney, Agent, or Firm* — Posz Law Group, PLC

(57) ABSTRACT

The device includes a rectifier circuit that converts alternating-current power from an alternating-current power supply into direct-current power; a short-circuit unit that short-circuits the alternating-current power supply via a reactor connected between the alternating-current power supply and the rectifier circuit; and a control unit that controls an ON/OFF operation of the short-circuit unit during a half cycle of the alternating-current power supply. The control unit includes a driving-signal generating unit that generates a driving signal Sa that is a switching pulse to control the ON/OFF operation of the short-circuit unit; and a pulse dividing unit that divides the driving signal Sa into a plurality of switching pulses.

27 Claims, 12 Drawing Sheets

(51) Int. Cl.
*H02M 1/08* (2006.01)
*H02M 1/42* (2007.01)
*H02M 1/00* (2006.01)

(56) References Cited

U.S. PATENT DOCUMENTS

| | | | |
|---|---|---|---|
| 2003/0137857 A1 | 7/2003 | Yamanaka et al. | |
| 2013/0033911 A1 | 2/2013 | Mizukoshi et al. | |
| 2014/0218989 A1* | 8/2014 | Mateu S Ez | G01R 19/04 363/126 |
| 2014/0225552 A1 | 8/2014 | Shinomoto et al. | |
| 2015/0256083 A1* | 9/2015 | Ito | H02M 3/335 363/16 |

FOREIGN PATENT DOCUMENTS

| | | | | |
|---|---|---|---|---|
| JP | 11-206130 A | | 7/1999 | |
| JP | 2006-174689 A | | 6/2006 | |
| JP | 2008-193815 A | | 8/2008 | |
| JP | 2010263775 A | * | 11/2010 | H02M 1/4233 |
| JP | 2011-101505 A | | 5/2011 | |
| JP | 2011-223831 A | | 11/2011 | |
| JP | 2013-106455 A | | 5/2013 | |
| JP | 5316823 B2 | | 7/2013 | |
| JP | 2014-108041 A | | 6/2014 | |
| JP | 2015-070724 A | | 4/2015 | |
| JP | 2015-171196 A | | 9/2015 | |
| WO | 01/65675 A1 | | 9/2001 | |
| WO | 2011/030640 A1 | | 3/2011 | |
| WO | 2013/061469 A1 | | 5/2013 | |

OTHER PUBLICATIONS

Office Action dated Jan. 9, 2018 issued in corresponding JP patent application No. 2016-549869 (and English translation).

* cited by examiner

CURRENT PATH WHEN SHORT-CIRCUIT ELEMENT IS ON

CURRENT PATH WHEN SHORT-CIRCUIT ELEMENT IS OFF

SHORT-CIRCUIT START TIME
SHORT-CIRCUIT DURATION TIME

POWER CONVERTING DEVICE

CROSS REFERENCE TO RELATED APPLICATION

This application is a U.S. national stage application of PCT/JP2014/075676 filed on Sep. 26, 2014, the contents of which are incorporated herein by reference.

FIELD

The present invention relates to a power converting device that converts alternating-current power into direct-current power.

BACKGROUND

The conventional technique described in Patent Literature 1 below discloses a power-factor improving circuit that improves the source power factor to reduce harmonic components contained in the input current and that selects a full-wave rectification mode or a double-voltage rectification mode and controls the short-circuit start time and short-circuit time of a short-circuit element by open-loop control so as to realize the functions to improve the power factor and to boost the voltage. That is, according to the conventional technique by Patent Literature 1, a rectifying circuit is controlled to go into the full-wave rectification mode or the double-voltage rectification mode by turning on and off a switch for switching the rectifying circuit, and therefore the direct-current output voltage range of the power-factor improving circuit is divided broadly into two levels; and the divided area of each of the two levels is further divided by open-loop variable short control of the short-circuit element into two levels, one without an improved power factor and one with an improved power factor, for a total of four levels of direct-current output voltage areas; so that the power factor on the high-load side can be improved with the output range of the direct-current output voltage being extended.

According to the conventional technique described in Patent Literature 2 below, provided is a direct-current voltage control unit that outputs a direct-current voltage control signal corresponding to the deviation value between a direct-current output voltage reference value set corresponding to the load and the voltage across the terminals of a smoothing capacitor; and also provided is a current reference arithmetic unit that outputs a current reference signal on the basis of the product of the control signal from the direct-current voltage control unit and a sinusoidal synchronizing signal synchronous with an alternating-current power supply. By comparing this current reference signal and the current on the alternating-current side of a rectifying element, a switch element is on/off-controlled at a high frequency, and thereby the direct-current output voltage is controlled to be at a desired value while the alternating-current input current is controlled to be sinusoidal. Therefore the occurrence of harmonics can be suppressed with the source power factor being at one.

CITATION LIST

Patent Literature

Patent Literature 1: Japanese Patent Application Laid-open Publication No. H11-206130
Patent Literature 2: Japanese Patent description No. 2140103

SUMMARY

Technical Problem

However, according to the conventional techniques by the above Patent Literatures 1, 2, the control pattern of the short-circuit element is limited. That is, according to these conventional techniques, the control pattern of the short-circuit element is limited to either a high-frequency switching mode in which the current is fed back across the entire load area or a partial switching mode of current open-loop control. Thus, according to these conventional techniques, in the low load area, the short-circuit element is made not to operate in order to avoid the direct-current output voltage excessively rising, and thus the power factor improvement is not performed. Therefore, in the low load area, the waveform distortion of the input current is large so that a current containing harmonic components in large amounts flows through a reactor; and thus reactor iron loss increases, resulting in a decrease in the AC/DC conversion efficiency of the power-factor improving circuit.

Further, in the conventional technique by the above Patent Literature 1, the short-circuit control of the short-circuit element when the power-factor improvement is performed is made in a partial switching method that controls the short-circuit start time and short-circuit time by the open-loop control to perform short-circuit operation during only a certain section of the power-supply cycle, and hence, although the power factor improvement and the boosting of the direct-current output voltage are possible; the effect is small on the high-load side where the occurrence amount of harmonics is large. Therefore, because the regulations to harmonics will become stricter in the future, a reactor having a large inductance value is needed in order to obtain an enough power-factor improvement effect, i.e., enough capability of suppressing harmonics with the conventional technique; and thus the problems occur such as a decrease in the AC/DC conversion efficiency, the circuit size becoming larger, and an increase in cost. Further, in a case where the direct-current output voltage is boosted with suppressing the occurrence amount of harmonics to a certain level, the boost capability is limited, and thus operation on the high-load side becomes unstable, or the range of load selection becomes narrower when taking into considerations of stable operations on the high-load side.

The present invention was made in view of the above facts, and an objective thereof is to provide a power converting device that can satisfy high boost performance and a harmonic standard while achieving higher efficiency across the entire load operation area.

Solution to Problem

In order to solve the problem and achieve the objective mentioned above, the present invention relates to a power converting device that includes: a rectifier circuit that converts alternating-current power from an alternating-current power supply into direct-current power; a short-circuit unit that short-circuits the alternating-current power supply via a reactor connected between the alternating-current power supply and the rectifier circuit; and a control unit that controls an ON/OFF operation of the short-circuit unit during a half cycle of the alternating-current power supply. The control unit includes: a driving-signal generating unit that generates a driving signal that is a switching pulse for controlling the ON/OFF operation of the short-circuit unit; and a pulse dividing unit that divides the driving signal into a plurality of switching pulses.

Advantageous Effects of Invention

The power converting device according to the present invention has the effect of being able to satisfy high boost performance and a harmonic standard while achieving higher efficiency over the entire load operation area.

DESCRIPTION OF EMBODIMENTS

A power converting device according to an embodiment of the present invention is described in detail below with reference to the drawings. Note that this embodiment is not intended to limit the present invention.

Embodiment

Figure 1:
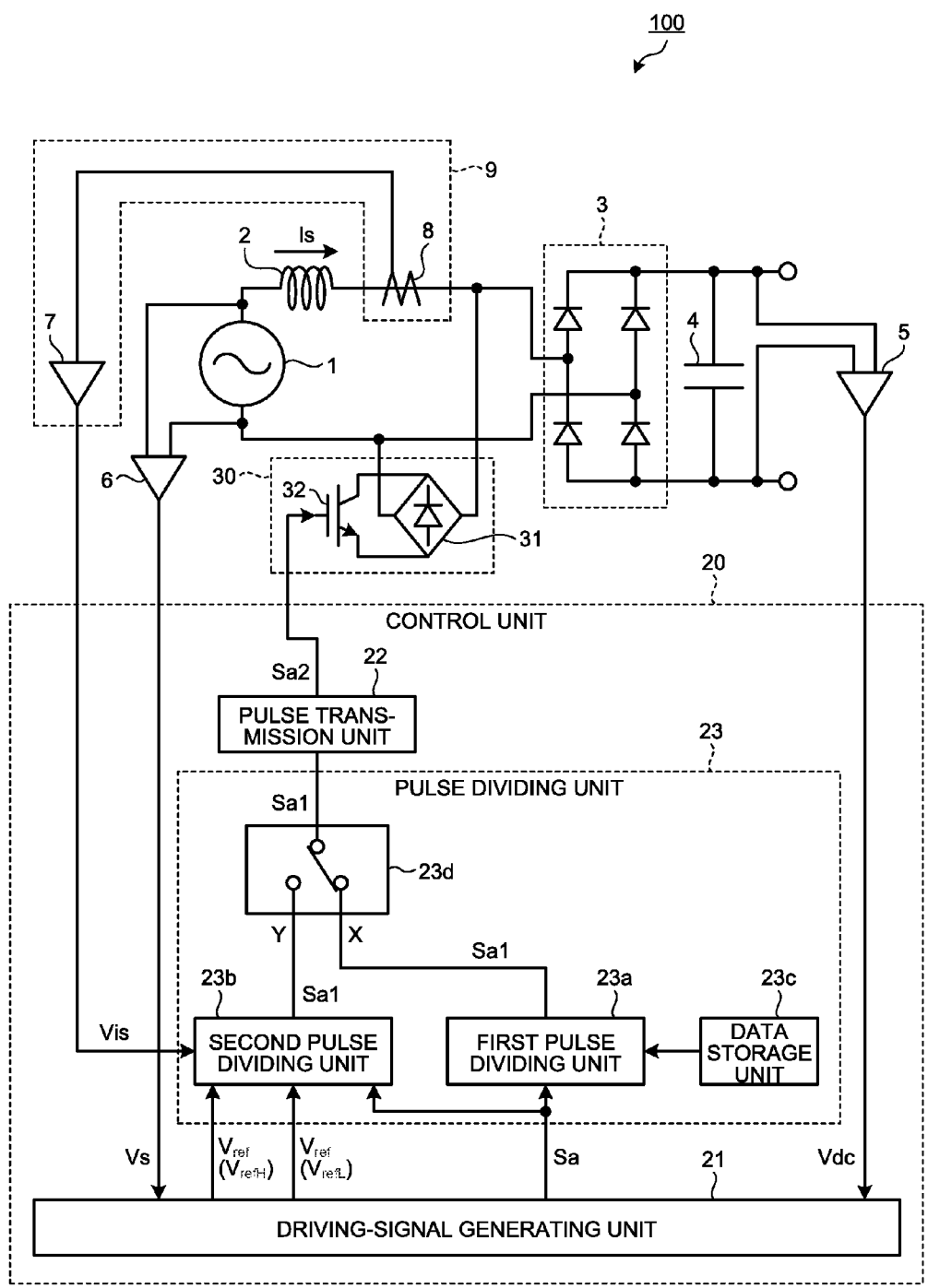
FIG. 1 is a diagram illustrating an example configuration of a power converting device according to an embodiment of the present invention.

FIG. 1 is a diagram illustrating an example configuration of a power converting device 100 according to the embodiment of the present invention. The device 100 includes a rectifying circuit 3 that converts AC power from an AC power supply 1 into DC power; a reactor 2 connected between the AC power supply 1 and the rectifying circuit 3; a current detecting means 9 that detects the power supply current Is of the AC power supply 1; a smoothing capacitor 4 connected between the output ends of the rectifying circuit 3 and that smooths the voltage of the full-wave rectified waveform output from the rectifying circuit 3; a DC voltage detector 5 that detects the DC output voltage Vdc that is the voltage across the smoothing capacitor 4; a power supply voltage detector 6 that detects the power supply voltage Vs of the AC power supply 1; a short-circuit unit 30 that short-circuits the AC power supply 1 via the reactor 2; and a control unit 20 that generates driving signals Sa2, which are multiple switching pulses, during the half cycle of the AC power supply 1 and that controls the opening and closing of the short-circuit unit 30 with the generated driving signals Sa2.

The reactor 2 is connected on the AC power supply 1 side of the short-circuit unit 30 and is inserted between one input end of the rectifying circuit 3 and the AC power supply 1. The rectifying circuit 3 includes a diode bridge in which four diodes are combined. Not being limited to this, the rectifying circuit 3 can include a combination of diode-connected metal oxide film semiconductor field-effect transistors that are unidirectional conductive elements.

The DC voltage detector 5 includes an amplifier or a level shift circuit, and it detects the voltage across the smoothing capacitor 4; converts the detected voltage into the DC output voltage Vdc, which is a detected voltage value within voltage range low enough for the control unit 20 to handle; and outputs the DC output voltage Vdc.

The current detecting means 9 includes a current detecting element 8 and a current detector 7. The current detecting element 8 is connected between the reactor 2 and the rectifying circuit 3 in order to detect the current value at the connection position. A current transformer or a shunt resistor is, for example, used as the current detecting element 8. The current detector 7 includes an amplifier or a level shift circuit and it converts a voltage proportional to the current detected by the current detecting element 8 into a current detection voltage Vis, which is within voltage range low enough for the control unit 20 to handle; and outputs the current detection voltage Vis.

The short-circuit unit 30, which is a bidirectional switch, includes a diode bridge 31 connected in parallel with the AC power supply 1 via the reactor 2 and a short-circuit element with ends that are connected to opposite output ends of the diode bridge 31. If the short-circuit element 32 is a metal oxide film semiconductor field-effect transistor, the gate of the short-circuit element 32 is connected to a pulse transmission unit 22; and the short-circuit element 32 is turned on/off by a driving signal Sa2 from the pulse transmission unit 22. When the short-circuit element 32 is turned on, the AC power supply 1 is short-circuited via the reactor 2 and the diode bridge 31.

The control unit 20 includes a microcomputer and includes a driving-signal generating unit 21 that generates a driving signal Sa, which is a switching pulse, to control the short-circuit element 32 of the short-circuit unit 30 and a reference voltage $V_{ref}$ on the basis of the DC output voltage Vdc and the power supply voltage Vs; a pulse dividing unit 23 that divides the driving signal Sa from the driving-signal generating unit 21 into multiple pulses to be output as the driving signals Sa1, which are multiple divided pulses, to the pulse transmission unit 22; and the pulse transmission unit 22 that converts the driving signals Sa1 from the pulse dividing unit 23 into driving signals Sa2 to transmit to the short-circuit unit 30.

The reference voltage $V_{ref}$ is a hysteresis reference voltage, which is a threshold to limit the value of the power supply current Is. The reference voltage $V_{ref}$ is a positive-polarity-side reference voltage $V_{refH}$ and a negative-polarity-side reference voltage $V_{refL}$. A circuit that generates the reference voltage $V_{ref}$ is described later.

The pulse dividing unit 23 includes a first pulse dividing unit 23a that divides the driving signal Sa into driving signals Sa1, which are multiple pulses, by performing processing using software; a second pulse dividing unit 23b that divides the driving signal Sa into multiple driving signals Sa1 by hardware processing; a data storage unit 23c that stores data necessary for performing calculation in the first pulse dividing unit 23a; and a selector 23d that selects the driving signals Sa1 from the first pulse dividing unit 23a or the driving signals Sa1 from the second pulse dividing unit 23b so as to output them to the pulse transmission unit 22. The details of the first pulse dividing unit 23a and second pulse dividing unit 23b are described later.

The selector 23d has two terminals on the input side. When its internal contact point is connected to the X-side terminal, the driving signals Sa1 generated by the first pulse dividing unit 23a are output to the pulse transmission unit 22; and when the internal contact point is connected to the Y-side terminal, the driving signals Sa1 generated by the second pulse dividing unit 23b are output to the pulse transmission unit 22.

The pulse transmission unit 22 includes a level shift circuit, and it performs a voltage-level shift so as to be able to perform gate driving; and converts the driving signals Sa1 from the pulse dividing unit 23 into the driving signals Sa2, which are gate driving signals, to be output to the short-circuit unit 30.

Figure 2:
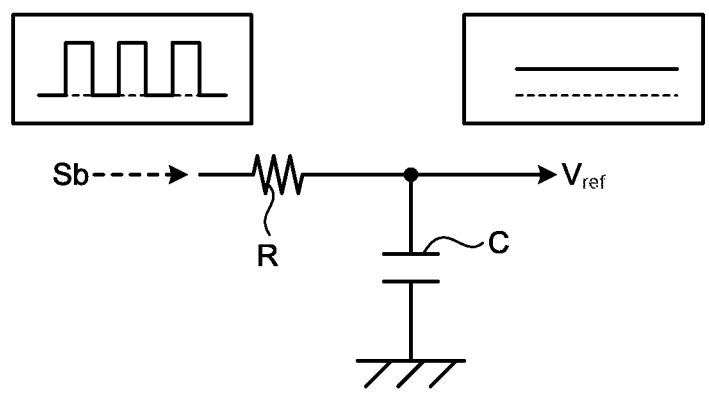
FIG. 2 is a first configuration diagram illustrating a reference-voltage generating circuit used in pulse control.
Figure 3:
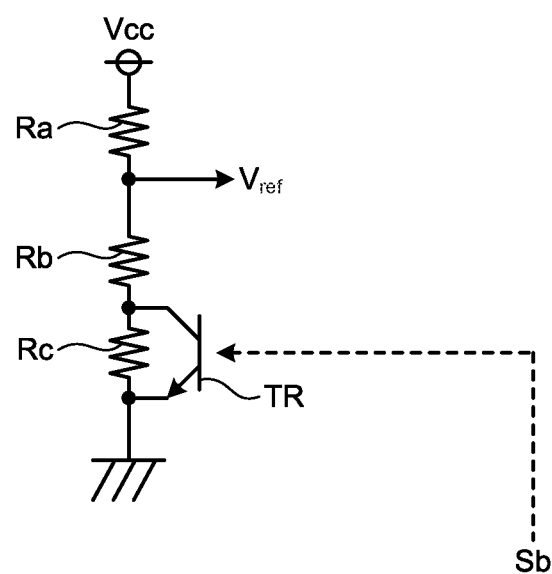
FIG. 3 is a second configuration diagram illustrating the reference-voltage generating circuit used in pulse control.

FIG. 2 is a first configuration diagram illustrating a reference-voltage generating circuit used in pulse control; and FIG. 3 is a second configuration diagram illustrating the reference-voltage generating circuit used in pulse control. The circuit illustrated in FIG. 2 converts a pulse width modulation signal that is a port output Sb of the driving-signal generating unit 21 into a DC value by using a low-pass filter, thereby generating the reference voltage $V_{ref}$. In this case, by controlling the duty ratio of the pulse width modulation signal, the value of the reference voltage $V_{ref}$ can be changed seamlessly. The circuit illustrated in FIG. 3 changes the value of the reference voltage $V_{ref}$ stepwise according to the voltage division ratio of the resistances Rb and Rc by driving a switch TR in accordance with the port output Sb of the driving-signal generating unit 21. The circuit that generates the reference voltage $V_{ref}$, not being limited to the circuits illustrated in FIGS. 2, 3, can be a known circuit other than the circuits illustrated in FIGS. 2, 3. Further, a reference voltage $V_{ref}$ that is generated outside the control unit 20 can be used.

Figure 4:
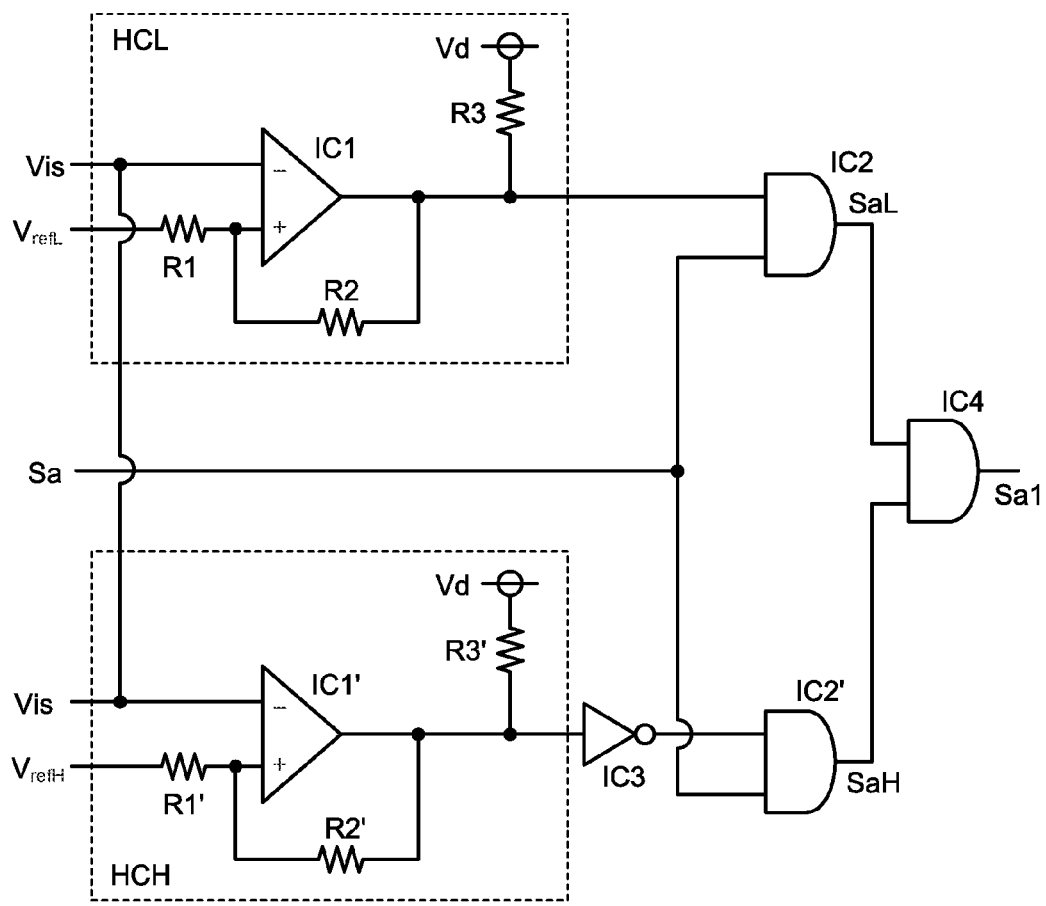
FIG. 4 is a diagram illustrating an example configuration of a second pulse dividing unit.

FIG. 4 is a diagram illustrating an example configuration of the second pulse dividing unit 23b. The second pulse dividing unit 23b has a positive-polarity-side hysteresis comparator HCH that determines, for hysteresis corresponding to the current control range on the positive-polarity side, by the relation between the positive-polarity-side upper-limit threshold calculated using the equation (1), the positive-polarity-side lower-limit threshold calculated using the equation (2), and the positive-polarity-side reference voltage $V_{refH}$, and that controls the waveform of the current detection voltage Vis; and a negative-polarity-side hysteresis comparator HCL that determines, for hysteresis corresponding to the current control range on the negative-polarity side, by the relation between the negative-polarity-side upper-limit threshold calculated from the equation (1), the negative-polarity-side lower-limit threshold calculated from the equation (2), and the negative-polarity-side reference voltage $V_{refL}$, and that controls the waveform of the current detection voltage Vis. Further, the second pulse dividing unit 23b includes a NOT logic IC 3 that inverts the output of the positive-polarity-side hysteresis comparator HCH; an AND logic IC 2' that performs an AND-gate logic on the output of the NOT logic IC 3 and the driving signal Sa so as to output a positive-polarity-side driving signal SaH; an AND logic IC 2 that performs an AND-gate logic on the output of the negative-polarity-side hysteresis comparator HCL and the driving signal Sa so as to output a negative-polarity-side driving signal SaL; and an AND logic IC 4 that performs an AND-gate logic on the positive-polarity-side driving signal SaH and the negative-polarity-side driving signal SaL so as to output the driving signal Sa1 that is the result of performing the AND logic. The current control range is the target control range of the power supply current Is of the AC power supply 1: the upper-limit threshold regulates the upper limit of the short-circuit current that flows when the short-circuit unit 30 is on; and the lower-limit threshold is set to a smaller value than the upper-limit threshold. $V_d$ in the equation (1) denotes a low-voltage-system power supply; and $V_{OL}$ in the equation (2) denotes the output saturation voltage of an operational amplifier.

[Formula 1]

$$V_{THH}(H) = V_{refH} + \frac{R_1}{R_1 + R_2 + R_3}(V_d - V_{refH}) \quad (1)$$

[Formula 2]

$$V_{THH}(L) = V_{refH} + \frac{R_1}{R_1 + R_2 + R_3}(V_{refH} - V_{OL}) \quad (2)$$

The current detector 7 illustrated in FIG. 1 has a level shift circuit and an amplifier provided at the output stage of the current detecting element 8 and it converts the current waveform of an alternating current detected by the current detecting element 8, with half of the low-voltage-system power supply Vd corresponding to 0 amperes, into a current waveform having only the positive side to output. Thus, the second pulse dividing unit 23b can generate the driving signals Sa1 regardless of current polarity.

By using the second pulse dividing unit 23b with a configuration that includes the plurality of hysteresis comparators, the driving signals Sa1 can be generated regardless of current polarity. By controlling the waveform of the power supply current Is, i.e., the current detection voltage Vis, by using the driving signals Sa1, the DC output voltage Vdc can be boosted while suppressing the peak values of the short-circuit current flowing when the short-circuit unit 30 is turned on.

In the hysteresis comparators, the widths of the hysteresis can be changed by changing the resistance values of the resistors R1, R1', R2, R2', R3, and R3'. For example, if a series circuit made up of a switch and a resistor is connected in parallel with the resistor R2 or R2', the combined resistance value can be changed by opening and closing the switch. By making the hysteresis comparators perform part of the processing load of the control unit 20, the calculation load on the control unit 20 is reduced so that the power converting device 100 can be made of an inexpensive central processing unit.

Figure 5:
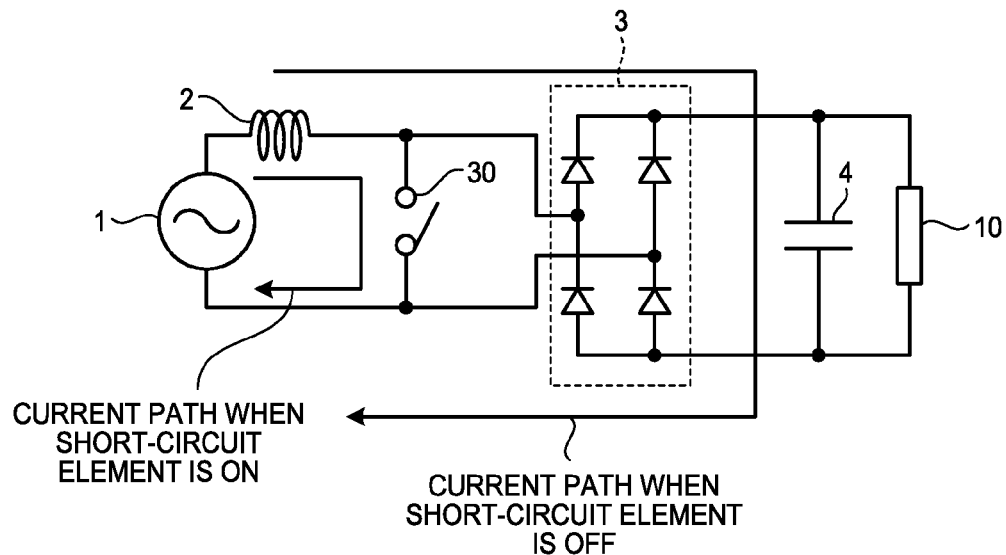
FIG. 5 is a diagram illustrating a simplified circuit comprising a reactor, a short-circuit unit, a rectifying circuit, and a smoothing capacitor.
Figure 6:
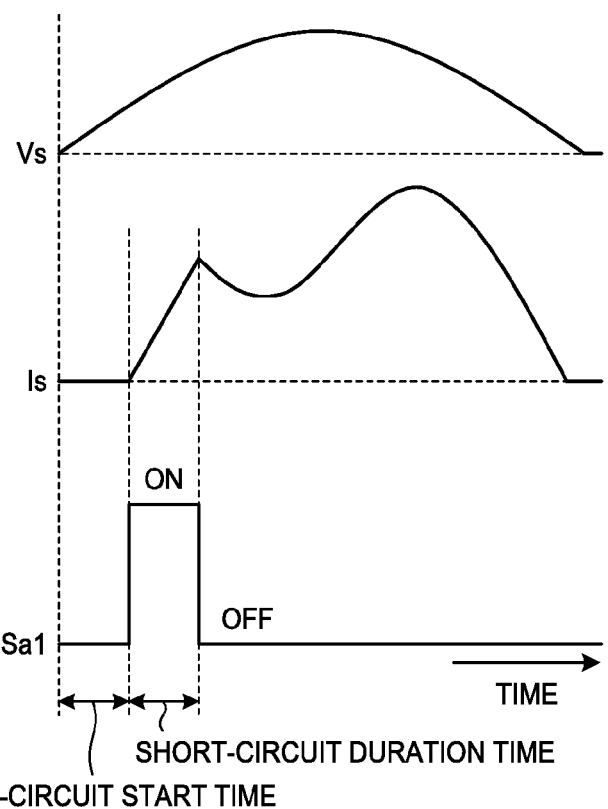
FIG. 6 is a diagram illustrating the waveform of the power supply current when a short-circuit element is switched once during a positive-polarity-side half cycle of an AC power supply while in a partial switching pulse mode.

The operation is described below. FIG. 5 is a diagram illustrating a simplified circuit comprising a reactor 2, a short-circuit unit 30, a rectifying circuit 3, and a smoothing capacitor 4. FIG. 5 also illustrates current paths when the short-circuit unit 30 is turned on and off. FIG. 6 is a diagram illustrating the waveform of the power supply current Is when the short-circuit element is switched once during a positive-polarity-side half cycle of the AC power supply 1 when in a partial switching pulse mode. FIG. 6 illustrates the driving signal Sa1 as a single pulse in the example operation performed while in the partial switching pulse mode, which is where the short-circuit unit 30 is switched once during a power-supply half cycle. The partial switching pulse mode is a mode in which the short-circuit unit 30 is turned on/off once or multiple times, i.e., a short-circuit operation is performed once or multiple times during a power-supply half cycle while under current open-loop control. When in the partial switching pulse mode, by controlling the short-circuit start time and short-circuit duration time of the short-circuit unit 30, the energy stored in the reactor 2 can be controlled so that the DC output voltage Vdc can be boosted in a stepless manner. Although FIG. 6 illustrates the driving signal Sa1 as a single pulse in a case where the short-circuit unit 30 is turned on/off once during a power-supply half cycle, the number of times when the short-circuit unit 30 is switched during a power-supply half cycle can be two or greater.

When the short-circuit unit 30 is turned on, a closed circuit is formed by the AC power supply 1, the reactor 2, and the short-circuit unit 30 so that the AC power supply 1 is short-circuited via the reactor 2. Hence, the power supply current Is flows through the closed circuit; and magnetic energy, obtained by dividing the square of the value I of power supply current Is multiplied by the inductance L of reactor 2 by two, is stored in the reactor 2. At the same time when the short-circuit unit 30 is turned off, the stored energy is discharged into the load 10 side to be rectified by the rectifying circuit 3 and transferred to the smoothing capacitor 4. By following this series of operations, the power supply current Is flows along the current path in FIG. 5. Thus, the current-carrying angle of the power supply current Is can be extended when compared with a passive mode without an improvement in the power factor, with the extension of the current carrying angle resulting in an improvement in the power factor.

Figure 7:
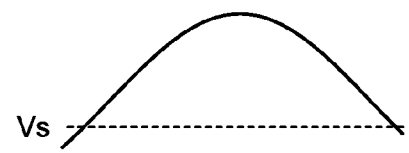
FIG. 7 is a diagram illustrating the waveform of the power supply current in a case where a driving signal is not divided into multiple pulses.
Figure 7:
Figure 7:
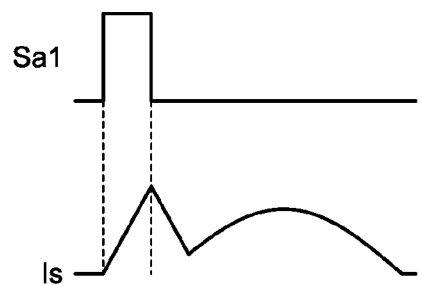

FIG. 7 illustrates the waveform of the power supply current Is when the driving signal Sa is not being divided into multiple pulses. At the time when the driving signal Sa is turned on, the driving signal Sa1 is turned on; and the driving signal Sa1 is also on for a length of time equal to the ON period t during the ON period t of the driving signal Sa. The ON period t is a period from when the driving signal Sa is turned on to when it is turned off. Thus, the short-circuit time of the short-circuit element 32 becomes longer in proportion to the ON period t of the driving signal Sa when the power supply voltage Vs is boosted, and thus the power supply current Is increases. When the power supply current Is reaches a set value, the driving signal Sa is turned off, and at the time when the driving signal Sa is turned off, the driving signal Sa1 is turned off.

If the short-circuit time period of the short-circuit element 32 is extended, more energy can be stored in the reactor 2; but problems occur in that the power factor becomes worse, that the number of harmonic components increases, and that circuit loss increases because the peak of the power supply current Is becomes larger.

Figure 8:
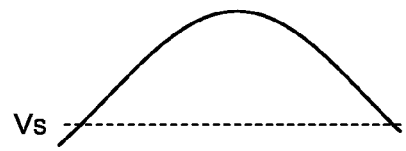
FIG. 8 is a diagram illustrating the waveform of the power supply current in a case where the driving signal is divided into multiple pulses.
Figure 8:
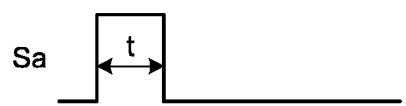
Figure 8:
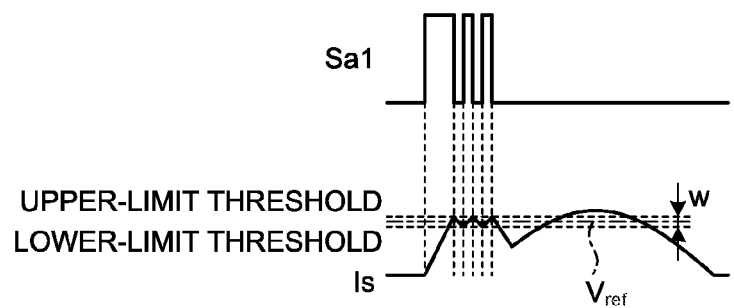

FIG. 8 illustrates the waveform of the power supply current Is when the driving signal Sa is divided into multiple pulses. At the time when the driving signal Sa is turned on, the driving signal Sa1 is turned on, and the power supply current Is increases. As the power supply current Is increases, the current detection voltage Vis, i.e., the current value detected by the current detector 7, goes up. When the detected current value becomes greater than the upper-limit threshold while the driving signal Sa is on, the pulse dividing unit 23 turns off the driving signal Sa1. Thus, the power supply current Is decreases, and therefore the detected current value goes down. Then, when the detected current value becomes less than the lower-limit threshold while the driving signal Sa is on, the pulse dividing unit 23 turns on the driving signal Sa1 again. Thus, the power supply current Is increases again, and therefore the current value detected by the current detector 7 goes up.

The driving signal Sa1 is repeatedly switched on/off during the ON period t of the driving signal Sa, and thus the peak values of the current detection voltage Vis, i.e., the peak values of the power supply current Is, are controlled such that they are within the current control range w during the ON period t of the driving signal Sa. Thus, even when the DC output voltage Vdc is boosted to a relatively high value, the peak values of the power supply current Is during the ON period t of the driving signal Sa are suppressed more than the peak value when the driving signal Sa1 changes from on to off.

By adjusting the upper-limit and lower-limit thresholds of the current control range w, the number of times the driving signal Sa1 is switched, i.e., the switching frequency of the driving signal Sa1 during the ON period t of the driving signal Sa, can be controlled.

Figure 9:
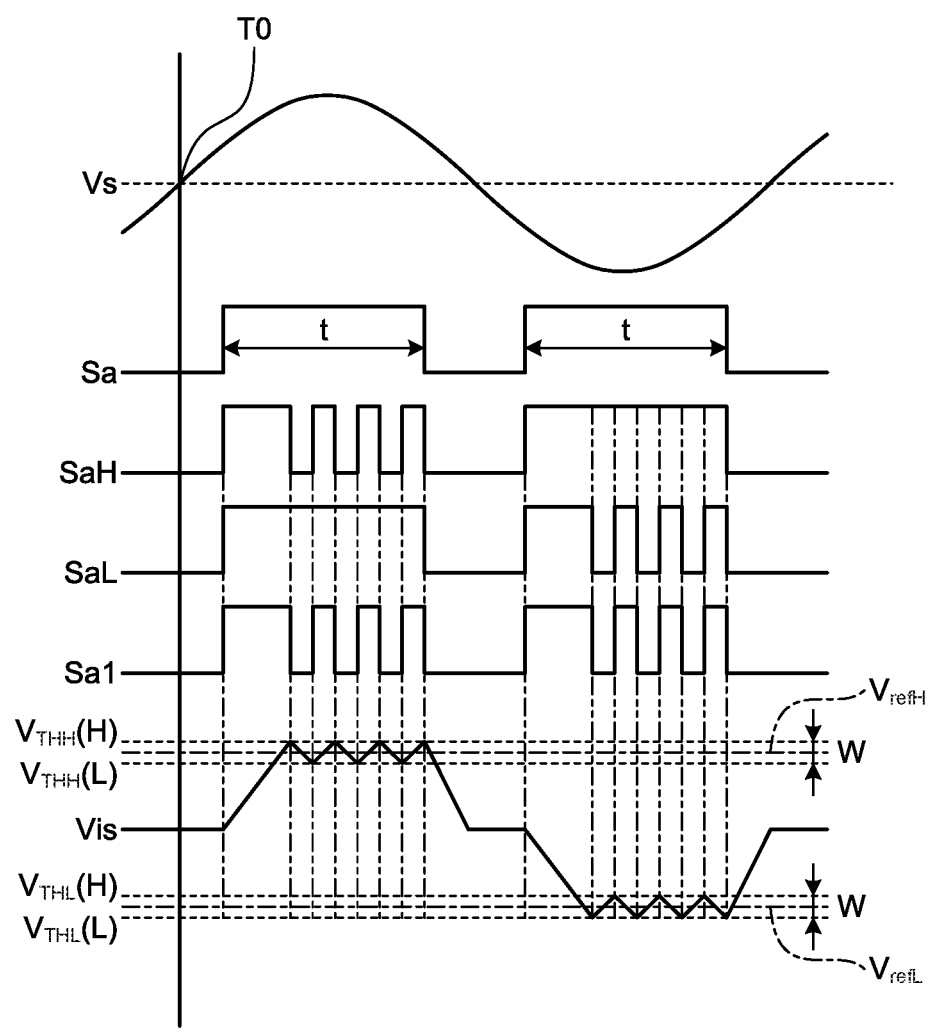
FIG. 9 is a diagram illustrating the waveform of the power supply current when the driving signal is divided into multiple pulses during the positive-polarity-side half cycle and negative-polarity-side half cycle.

FIG. 9 is a diagram illustrating the waveform of the power supply current when the driving signal Sa is divided into multiple pulses during the positive-polarity-side half cycle and negative-polarity-side half cycle. FIG. 9 illustrates a positive-polarity-side driving signal SaH, a negative-polarity-side driving signal SaL, a positive-polarity-side upper-limit threshold $V_{THH}(H)$, a positive-polarity-side lower-limit threshold $V_{THH}(L)$, a negative-polarity-side upper-limit threshold $V_{THL}(H)$, and a negative-polarity-side lower-limit threshold $V_{THL}(L)$ when the second pulse dividing unit 23b performs division.

Because the operation of dividing into pulses is performed for the positive and negative polarity sides of the AC power supply 1, the peak values of the power supply current Is on the positive-polarity side are within a current control range w with the positive-polarity-side reference voltage $V_{refH}$ as the center value; and the peak values of the power supply current Is on the negative-polarity side are within a current control range w with the negative-polarity-side reference voltage $V_{refL}$ as the center value.

If the switching frequency is relatively high, the switching causes the problems of increase in loss, radiant noise, and noise terminal voltage. In solving these problems, by extending the current control range w with the reference voltage $V_{ref}$ as the center value, the number of switching times of the driving signal Sa1 is reduced. Thus, the switching frequency is lowered so that the increase in loss, radiant noise, and noise terminal voltage can be suppressed.

In contrast, when the switching frequency is relatively low, the problem of noise in an audible frequency band can occur. In solving this problem, by narrowing the current control range w with the reference voltage $V_{ref}$ as the center value, the number of switching times of the driving signal Sa1 is increased. Thus, the switching frequency is raised so that the noise can be suppressed.

Next, the configuration of the first pulse dividing unit 23a is described. When the short-circuit unit 30 is switched using the first pulse dividing unit 23a, the ON and OFF timings of the short-circuit unit 30 need to be determined. To this end, the rise time Ta and fall time Tb of the driving signal Sa need to be identified.

Figure 10:
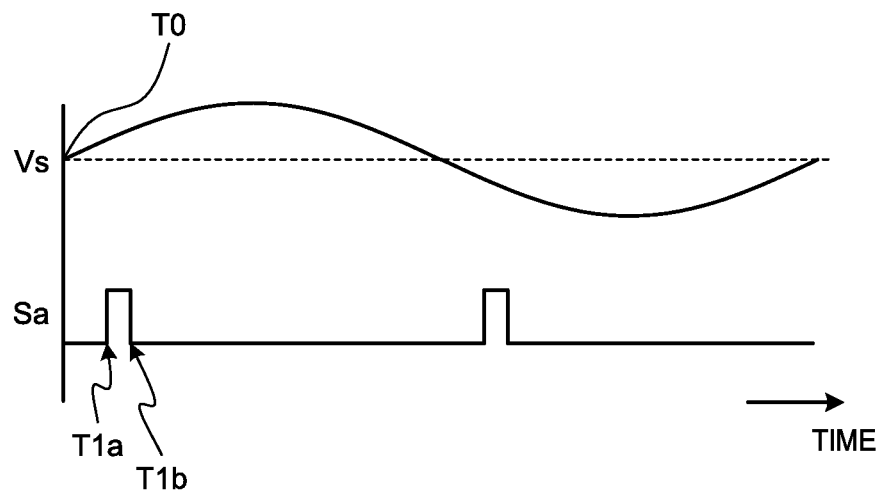
FIG. 10 is a diagram illustrating the driving signal that switches the short-circuit unit once during a power-supply half cycle.
Figure 11:
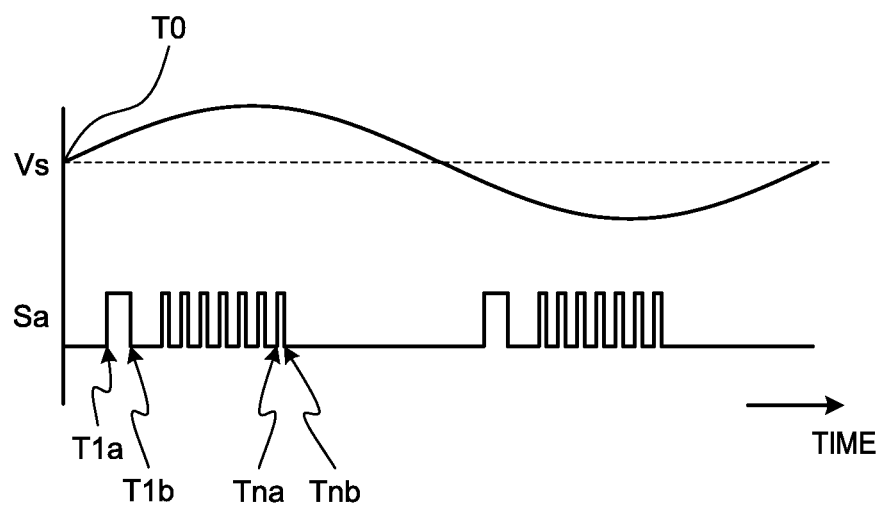
FIG. 11 is a diagram illustrating the driving signal that switches the short-circuit unit multiple times during a power-supply half cycle.

FIG. 10 is a diagram illustrating the driving signal that switches the short-circuit unit 30 once during a power-supply half cycle; FIG. 11 is a diagram illustrating the driving signal that switches the short-circuit unit 30 multiple times during a power-supply half cycle.

Given that T1a and T1b be the times when the driving signal Sa rises and falls at time points when a certain time has elapsed from a zero cross point T0 respectively. For example, if the time from the zero cross point T0 to T1a and the time from the zero cross point T0 to T1b are held as data, the ON and OFF times of the short-circuit unit 30 can be identified. By using these time data, the first pulse dividing unit 23a can switch the short-circuit unit 30 once during a power-supply half cycle as illustrated in FIG. 10.

In contrast, when the short-circuit unit 30 is switched N number of times during a power-supply half cycle, N is an integer of two or greater, as illustrated in FIG. 11. Given Tna and Tnb be the times when an nth driving signal Sa rises and falls at time points when a certain time has elapsed from a zero cross point T0 respectively. In this case, a number of data proportional to the value of n need to be held to identify the ON and OFF timings of the short-circuit unit 30; and thus control parameters increase in number as the number of switching times increases. The designing the control parameters can become complex depending on operation conditions such as a DC voltage instruction, the size of the load, and the type of the load; and thus the increase in the number of switching times results in a lot of time consumptions in the reliability verification or evaluation of the data.

In contrast, when the second pulse dividing unit 23b constituted by hardware is used, reliability verification or evaluation of data is unnecessary. But, for example, if the hardware configuration needs to be changed to make adaptable to operation conditions, it can be difficult to change the configuration because of constraints of size or cost.

The inventors of the present patent application directed their attention to tendencies of changes over time in the ON times and OFF times of multiple driving signals Sa1 generated during the power-supply half cycle so that the peak values of the power supply current Is are within the current control range w and have come up with the highly-reliable power converting device 100 that suppresses increase in control parameters, thus reducing the time and load required for reliability verification or evaluation so as to achieve higher efficiency without causing a large increase in cost.

Figure 12:
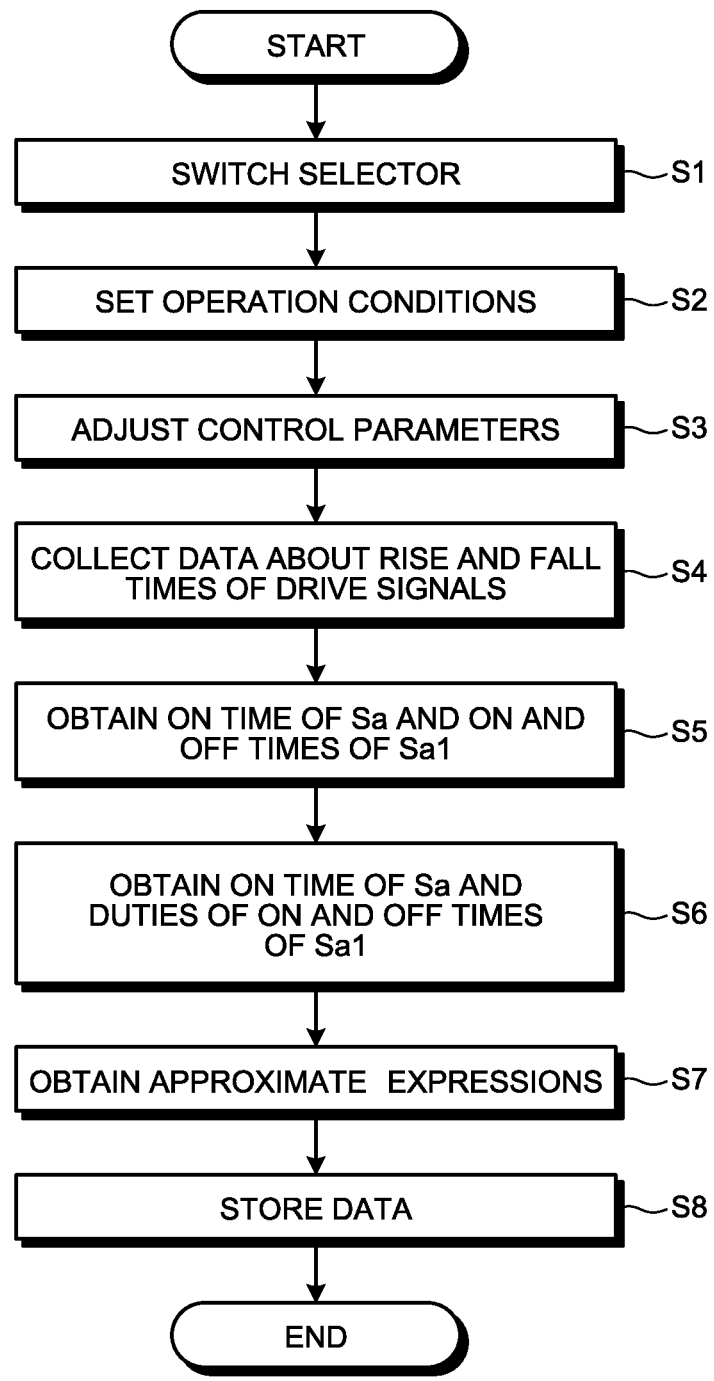
FIG. 12 is a flow chart illustrating a procedure for creating data to be used in a first pulse dividing unit.

FIG. 12 is a flow chart illustrating a procedure of creating data to be used in the first pulse dividing unit 23a. An example is described in a case where data to be stored into the data storage unit 23c is obtained using multiple driving signals Sa1 generated by the second pulse dividing unit 23b illustrated in FIG. 1.

(Step S1)

The internal contact point of the selector 23d illustrated in FIG. 1 is switched to the Y-side terminal. By this operation, driving signals Sa1 can be automatically obtained using the driving signal Sa generated by the driving-signal generating unit 21.

(Step S2)

Operation conditions are set in, e.g., the driving-signal generating unit 21.

(Step S3)

A current limiting level and the current control range w for the power supply current Is are adjusted. The current limiting level is determined by the positive-polarity-side reference voltage $V_{refH}$ and the negative-polarity-side reference voltage $V_{refL}$; and the current control range w is determined by the resistance values of the resistors R1, R1', R2, R2', R3, and R3' illustrated in FIG. 4. The current limiting level and the current control range w are adjusted using these limited parameters so that desired performance of boosting, power-supply power factor, or harmonic current can be obtained.

(Step S4)

The rise time and fall time of the driving signal Sa generated by the driving-signal generating unit 21 under the operation conditions set at step S2 and with the parameters adjusted at step S3 are collected; and the rise times and fall times of multiple driving signals Sa1 generated by the second pulse dividing unit 23b using the parameters of step S3 are collected. The data collection is by the analysis or the use of an actual device.

(Step S5)

The ON time Ton of the driving signal Sa and the ON time Ton and OFF time Toff of each driving signal Sa1 are determined using data collected at step S4.

Figure 13:
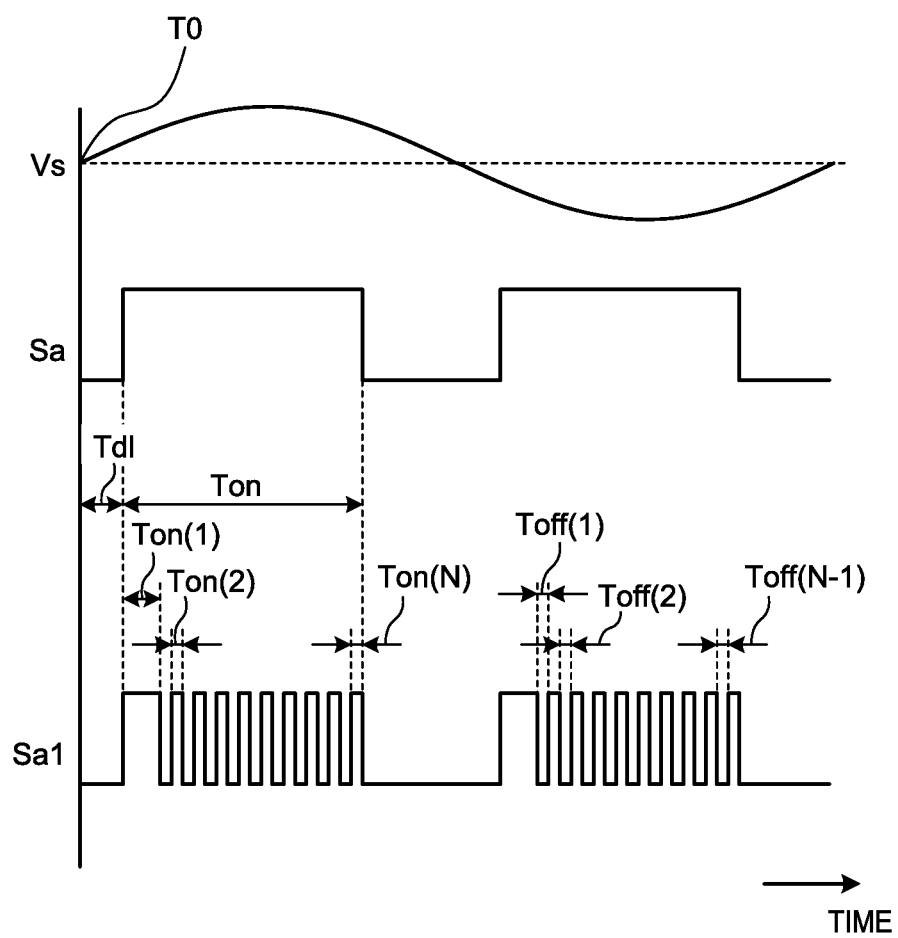
FIG. 13 is a diagram illustrating the ON time of the driving signal generated by a driving-signal generating unit and also illustrating the ON times and OFF times of driving signals divided by the second pulse dividing unit.

FIG. 13 is a diagram illustrating the ON time Ton of the driving signal Sa generated by the driving-signal generating unit 21 and the ON times Ton and OFF times Toff of driving signals Sa1 divided by the second pulse dividing unit 23b.

FIG. 13 illustrates the driving signal Sa generated during the positive-polarity-side half cycle and negative-polarity-side half cycle of the power supply voltage Vs, and N number of driving signals Sa1 generated during the ON time Ton of the driving signal Sa, where N is an integer of two or greater.

When a certain time Td1 has elapsed from a zero cross point T0 during the rise of the power supply voltage Vs, the driving signal Sa and the first driving signal Sa1 both become on. Ton(1) denotes the ON time of the first driving signal Sa1 generated during the positive-polarity-side half cycle, i.e., the time from when the first driving signal Sa1 rises to the time when it falls. Ton(2) denotes the ON time of the second driving signal Sa1 generated during the positive-polarity-side half cycle; and Ton(N) denotes the ON time of the Nth driving signal Sa1 generated during the positive-polarity-side half cycle.

Likewise, when a certain time has elapsed from a zero cross point during the fall of the power supply voltage Vs, the driving signal Sa and the first driving signal Sa1 both become on. Toff(1) denotes the OFF time between the first driving signal Sa1 and the second driving signal Sa1 generated during the negative-polarity-side half cycle, i.e., the time from when the first driving signal Sa1 falls to the time when the second driving signal Sa1 rises. Toff(2) denotes the OFF time between the second driving signal Sa1 and the third driving signal Sa1 generated during the negative-polarity-side half cycle; and Toff(N−1) denotes the OFF time between the (N−1)th driving signal Sa1 and the Nth driving signal Sa1 generated during the negative-polarity-side half cycle.

The ON time Ton of the driving signal Sa and the ON time Ton and OFF time Toff of each driving signal Sa1 illustrated in FIG. 13 are obtained according to the rise time and fall time of the driving signal Sa and the rise times and fall times of the first to Nth individual driving signals Sa1 collected at step S4. Further, the pulse number of each driving signal Sa1 and the inter-pulse number of the interval between the driving signal Sa1 and the next driving signal Sa1 are obtained according to the order of the driving signals Sa1 collected.

(Step S6)

Next, the ON duty of the ON time Ton of each driving signal Sa1 for the ON time Ton of the driving signal Sa and the OFF duty of the OFF time Toff of each driving signal Sa1 for the ON time Ton of the driving signal Sa are obtained by using the ON time and OFF time of each driving signal Sa1 obtained at step S5.

As mentioned above, when directing attention to tendencies of changes over time in the ON times and OFF times of multiple driving signals Sa1 generated during the power-supply half cycle, one can find regularity in the ON duties and the OFF duties. A specific description is made below.

The following functions are defined so as to calculate the ON duty and the OFF duty.

[Formula 3]

$$\text{on\_duty}(x) = \frac{T_{on}(x)}{T_{on}} \ \{2 \leq x \leq N\} \quad (3)$$

[Formula 4]

$$\text{off\_duty}(y) = \frac{T_{off}(y)}{T_{on}} \ \{1 \leq y \leq (N-1)\} \quad (4)$$

The equation (3) expresses the ON duty of the ON time Ton(x) of the xth driving signal Sa1 in the power-supply half cycle for the ON time Ton of the driving signal Sa. N is the total number of driving signals Sa1 generated during the power-supply half cycle.

The equation (4) expresses the OFF duty of the OFF time Toff(y) between the xth driving signal Sa1 and the (x−1)th driving signal Sa1 in the power-supply half cycle for the ON time Ton of the driving signal Sa. N is the total number of driving signals Sa1 generated during the power-supply half cycle.

Figure 14:
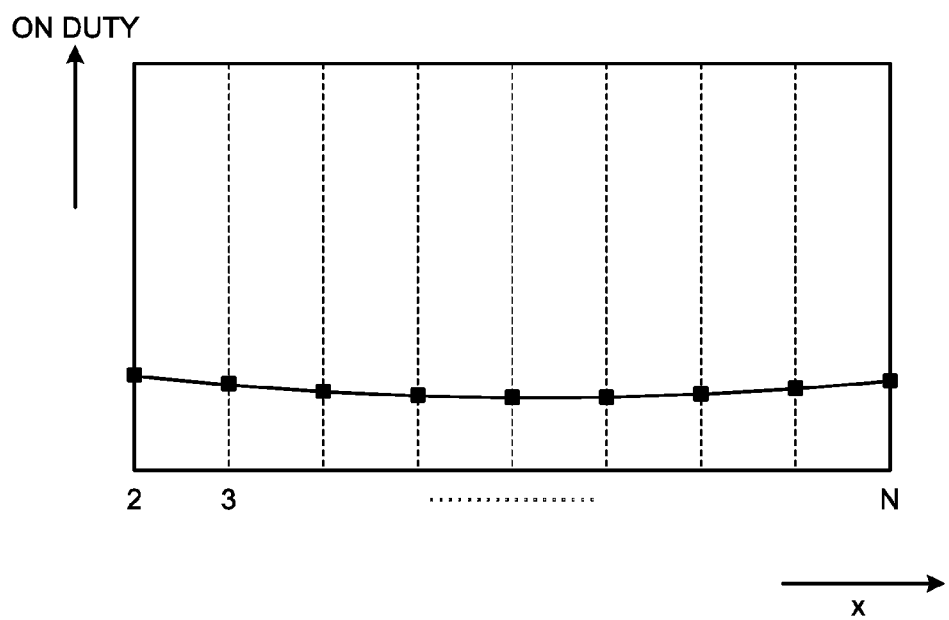
FIG. 14 is a graph illustrating changes over time in the ON duty for N driving signals generated during the power-supply half cycle.

FIG. 14 is a graph illustrating changes over time in the ON duty for N driving signals Sa1 generated during the power-supply half cycle. The horizontal axis represents the pulse number x, which takes on numbers of second to Nth ones of N driving signals Sa1 generated during the power-supply half cycle, and the vertical axis represents the ON duty for the second to Nth driving signals Sa1n obtained from the equation (3).

Paying attention to a pulse train of the second to Nth driving signals Sa1, it is understood that the ON duty, when the peak values of the power supply current Is are within the current control range w as illustrated in FIG. 9, draws a parabola pointing downward and has a characteristic illustrating relatively gentle gradients.

Figure 15:
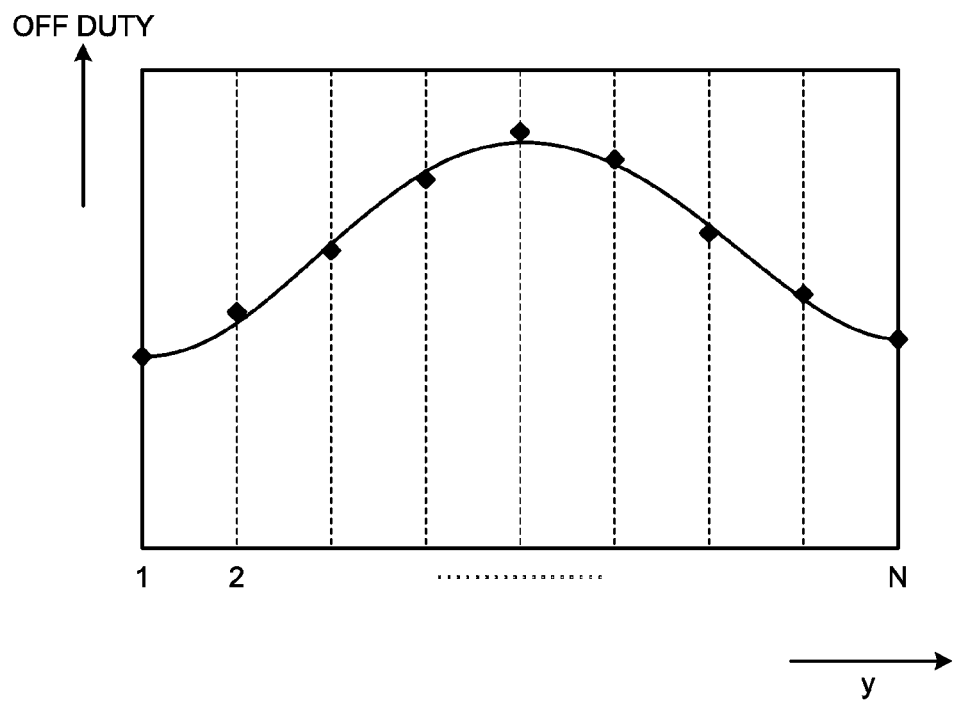
FIG. 15 is a graph illustrating changes over time in the OFF duty for N driving signals generated during the power-supply half cycle.

FIG. 15 is a graph illustrating changes over time in the OFF duty for N driving signals Sa1 generated during the power-supply half cycle. The horizontal axis represents the inter-pulse number y, which is the number of the interval between each driving signal Sa1 and the next generated during the power-supply half cycle, and the vertical axis represents the OFF duty for the first to Nth driving signals Sa1n obtained from the equation (4).

Paying attention to a pulse train of the first to Nth driving signals Sa1, it is seen that the OFF duty, when the peak values of the power supply current Is are within the current control range w as illustrated in FIG. 9, draws a parabola pointing upward and has a characteristic illustrating steeper gradients than the ON duty.

(Step S7)

The ON duty and OFF duty for multiple driving signals Sa1 generated during the power-supply half cycle change over time and are different in the tendency of change. The inventors of the present patent application came up with a method of expressing the ON duty and OFF duty for driving signals Sa1 in a particular area from among multiple driving signals Sa1 generated during the power-supply half cycle as approximate expressions.

The ON duty has a characteristic illustrating relatively gentle gradient. Hence, the ON duty given by the equation (3) can be approximated by, e.g., a quadratic expressed by the equation (5), where $A_1$, $B_1$, and $C_1$ are constants of the approximate expression.

[Formula 5]

$$\text{on\_duty}(x) = A_1 \cdot x^2 + B_1 \cdot x + C_1 \{2 \leq x \leq N\} \quad (5)$$

Although the OFF duty given by the equation (4) can be approximated by a quadratic, the OFF duty has a characteristic illustrating relatively steep gradients as compared with the ON duty. In the present embodiment, in order to increase the degrees of freedom in duty setting, it is approximated by a biquadratic expressed by the equation (6), where $A_2$, $B_2$, $C_2$, $D_2$, and $E_2$ are constants of the approximate expression.

[Formula 6]

$$\text{off\_duty}(y) = A_2 \cdot y^4 + B_2 \cdot y^3 + C_2 \cdot y^2 + D_2 \cdot y + E_2 \{1 \leq y \leq (N-1)\} \quad (6)$$

The ON duty of the first driving signal Sa1, which is a pulse in an area other than the particular area, can be expressed by the equation (7). N is the total number of driving signals Sa1 generated during the power-supply half cycle. As such, for the ON time of the first driving signal Sa1, an error associated with the approximate expression can be absorbed by using the equation (7) without setting the ON duty.

[Formula 7]

$$\text{on\_duty}(1) = 1 - \sum_{k=2}^{N} \text{on\_duty}(k) - \sum_{k=1}^{N-1} \text{off\_duty}(k) \quad (7)$$

In this way, an approximate expression of the ON duty for driving signals Sa1 in the particular area from among multiple driving signals Sa1 generated during the power-supply half cycle, an approximate expression of the OFF duty for multiple driving signals Sa1 generated during the power-supply half cycle, and the ON duty of a driving signal Sa1 in an area other than the particular area are obtained.

(Step S8)

The ON duties obtained at step S7 are associated with pulse numbers so as to form a function; the OFF duties obtained at step S7 and inter-pulse numbers are made to form a function; and these data in the form of functions and data about constants of the approximate expressions are stored into the data storage unit 23c.

The first pulse dividing unit 23a measures the ON time Ton of the driving signal Sa from the driving-signal generating unit 21 and multiplies the ON duty and OFF duty read from the data storage unit 23c by the ON time Ton of the driving signal Sa, thereby determining the ON and OFF times of the first to Nth driving signals Sa1 in the power-supply half cycle. Thus, the ON and OFF timings of the short-circuit unit 30 are uniquely determined so that, at these ON and OFF timings, the driving signal Sa can be divided into multiple driving signals Sa1.

As such, by using functions expressing the pulse train arrangement in terms of duties, the ON and OFF timings of the short-circuit unit 30 can be identified without causing an increase in the number of control parameters to be stored into the data storage unit 23c when the number of switching times increases.

Note that although in the present embodiment the reactor 2 is inserted between the AC power supply 1 and the rectifying circuit 3, and the rectifying circuit 3 is connected to the AC power supply 1 via the reactor 2, the positional relation between the rectifying circuit 3, the reactor 2, and the short-circuit unit 30 is not limited to the example configuration illustrated in the figure because the highly-reliable power converting device 100 need only be able to short-circuit and open the power supply via the reactor 2. That is, the highly-reliable power converting device 100 need only be configured such that the power supply current Is flows through the AC power supply 1, the reactor 2, the short-circuit unit 30, and the AC power supply 1 in that order at the time of short-circuiting; and it can have, e.g., a configuration where the rectifying circuit 3 is inserted between the AC power supply 1 and the reactor 2, in which the reactor 2 is connected to the AC power supply 1 via the rectifying circuit 3.

Although in the present embodiment the power supply voltage Vs, the power supply current Is, and the DC output voltage Vdc are detected to generate the driving signals Sa1, the power supply current Is does not necessarily need to be detected while the first pulse dividing unit 23a is made to operate according to data stored in the data storage unit 23c, but it should be selected depending on the system specification to be constructed whether the power supply current detection is needed. Although the present embodiment describes an example where the duties are expressed by functions, data in the form of functions expressing ON times and OFF times or data in the form of quadratic or higher-degree approximate expressions expressing ON times and OFF times can be stored into the data storage unit 23c to be used in pulse dividing operation.

Although the present embodiment describes an example where pulses are generated using approximate expressions, for example, if the number of driving signals Sa1 generated during the power-supply half cycle is relatively small, the control unit 20 can be configured such that with data about duties obtained at step S6 being stored instead of approximate expressions or data about the ON time of each pulse and the OFF time between each pulse and the next obtained at step S5 being stored, and thus driving signals Sa1 are generated using these data. Also with this configuration, the first pulse dividing unit 23a can perform pulse division so that an increase in cost associated with improvement in the control unit 20 can be reduced.

Only one of the first pulse dividing unit 23a and the second pulse dividing unit 23b can be used, or they can be changed from one to the other to be used according to operation conditions. For example, if it is difficult to change the configuration of the control unit 20 because of constraints of size or cost, only the first pulse dividing unit 23a is used with the internal contact point of the selector 23d being connected to the X-side terminal. If, although constraints of cost are not serious, accuracy in generating the waveform of the power supply current Is needs to be raised in order to use it in various specification environments, only the second pulse dividing unit 23b is used with the internal contact point of the selector 23d being connected to the Y-side terminal. If a particular pulse pattern needs to be output without depending on the power supply current Is for noise control under particular operation conditions while raising accuracy in generating the waveform, the internal contact point of the selector 23d is switched to the X-side terminal or the Y-side terminal according to operation conditions, and thus both the first pulse dividing unit 23a and the second pulse dividing unit 23b are used.

Although the present embodiment has described an example operation where, with making the value of the reference voltage $V_{ref}$ constant, the power supply current Is in a rectangular wave shape is generated, the device 100 can be configure such that, with making the reference voltage $V_{ref}$ change over time, the power supply current Is in a shape other than the rectangular wave is generated. Although the present embodiment has described an example where data to be stored into the data storage unit 23c is obtained using driving signals Sa1 generated by the second pulse dividing unit 23b, not being limited to this, in analysis in advance, a function associating the ON duty of each driving signal Sa1 with the pulse number and a function associating the OFF duty of each driving signal Sa1 with the inter-pulse number are obtained on the basis of such ON and OFF times of the driving signals Sa1 that the peak values of the power supply current Is are within the current control range w during the ON period of the driving signal Sa, and these data in the form of functions and data about constants of the approximate expressions can be stored into the data storage unit 23c.

Figure 16:
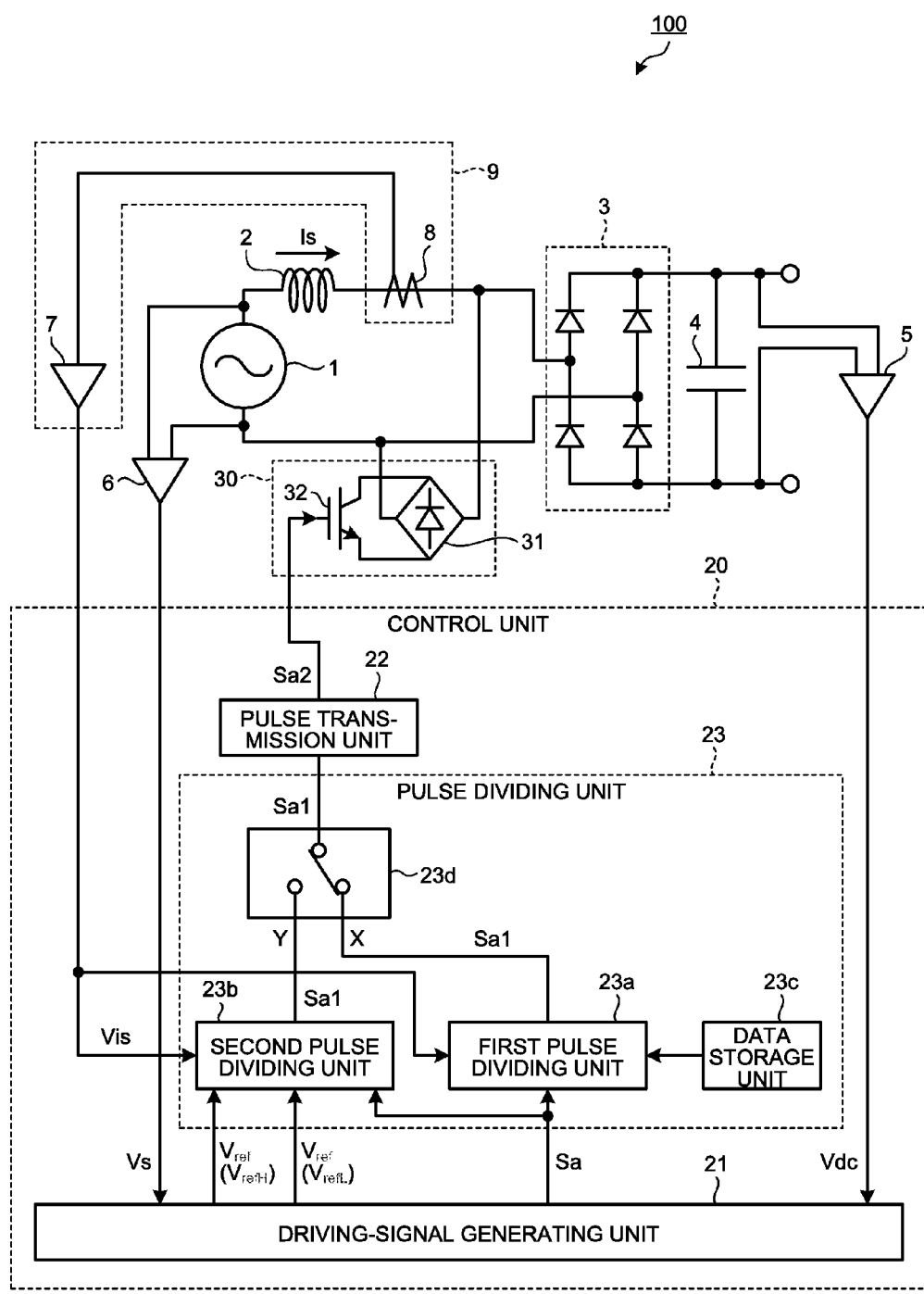
FIG. 16 is a diagram illustrating a first modified example of the power converting device according to the embodiment of the present invention.

Alternatively, the first pulse dividing unit 23a can have the following configuration. FIG. 16 is a diagram illustrating a first modified example of the power converting device 100 according to the embodiment of the present invention. For simplicity of description, given that data stored in the data storage unit 23c is ON times and OFF times or ON duties and OFF duties. In the power converting device 100 illustrated in FIG. 16, the current detection voltage Vis detected by the current detecting means 9 is input to the first pulse dividing unit 23a, and the first pulse dividing unit 23a calculates correction coefficients to correct ON duties and OFF duties or ON times and OFF times on the basis of the current detection voltage Vis. The first pulse dividing unit 23a multiplies ON duties and OFF duties or ON times and OFF times read from the data storage unit 23c by the correction coefficients. The first pulse dividing unit 23a multiplies the corrected ON duties and OFF duties or ON times and OFF times by the ON time Ton of the driving signal Sa. With this configuration, accuracy of the ON and OFF times of the driving signals Sa1 can be improved.

Figure 17:
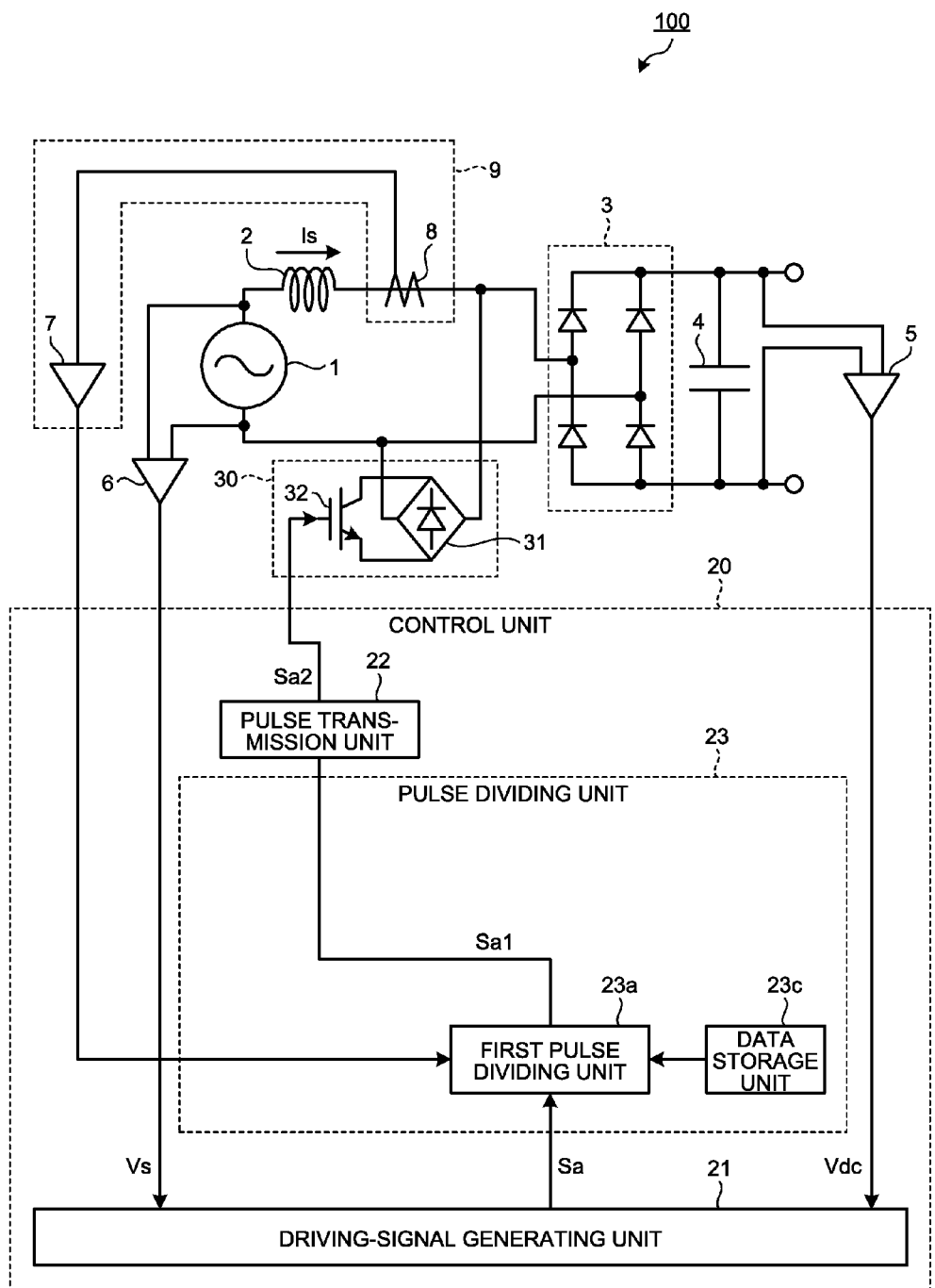
FIG. 17 is a diagram illustrating a second modified example of the power converting device according to the embodiment of the present invention.

Alternatively, the pulse dividing unit 23 can have the following configuration. FIG. 17 is a diagram illustrating a second modified example of the power converting device 100 according to the embodiment of the present invention. From the pulse dividing unit 23 illustrated in FIG. 17, the selector 23d and the second pulse dividing unit 23b illustrated in FIG. 16 are omitted. That is, the pulse dividing unit 23 includes the first pulse dividing unit 23a and the data storage unit 23c; the first pulse dividing unit 23a calculates correction coefficients to correct ON times and OFF times on the basis of the current detection voltage Vis; and driving signals Sa1 generated by the first pulse dividing unit 23a are output directly to the pulse transmission unit 22. Where ON duties and OFF duties are not corrected, the pulse dividing unit 23 can be configured such that the current detection voltage Vis is not input to the first pulse dividing unit 23a. Where correction coefficients are not calculated, the pulse dividing unit 23 can be configured such that the current detection voltage Vis is not input to the first pulse dividing unit 23a.

Note that where only the second pulse dividing unit 23b is used, the pulse dividing unit 23 can also be configured likewise. In this case, the pulse dividing unit 23 has only the second pulse dividing unit 23b illustrated in FIG. 16, and driving signals Sa1 generated by the second pulse dividing unit 23b are output directly to the pulse transmission unit 22.

As described above, the power converting device 100 according to the present embodiment includes the rectifying circuit that converts AC power from the AC power supply into DC power; the short-circuit unit that short-circuits the AC power supply via the reactor connected between the AC power supply and the rectifying circuit; and the control unit that controls the ON and OFF operation of the short-circuit unit during the half cycle of the AC power supply. The control unit has the driving-signal generating unit that generates a driving signal that is a switching pulse to control the ON and OFF operation of the short-circuit unit and the pulse dividing unit that divides the driving signal into multiple switching pulses. With this configuration, the power converting device 100 that is highly reliable while achieving higher efficiency can be provided.

The pulse dividing unit divides the driving signal into multiple switching pulses by either performing processing using software or hardware. With this configuration, if it is difficult to change the configuration of the control unit 20 because of constraints of size or cost, pulse division by processing using software can be performed; and if accuracy in generating the waveform of the power supply current Is needs to be raised in order to use it in various specification environments, pulse division by hardware processing can be performed.

The pulse dividing unit includes the first pulse dividing unit that divides the driving signal into multiple switching pulses by processing using software; the second pulse dividing unit that divides the driving signal into multiple switching pulses by hardware processing; and the selector that selects the switching pulses from the first pulse dividing unit or the switching pulses from the second pulse dividing unit to output. With this configuration, the first pulse dividing unit 23a and the second pulse dividing unit 23b can be easily switched from one to the other to be used according to operational conditions.

Further, the pulse dividing unit comprises the data storage unit that stores data used in dividing the driving signal into multiple switching pulses by processing using software and divides the driving signal into multiple switching pulses on the basis of the data stored in the data storage unit. With this configuration, pulse division can be performed without inputting data from the outside of the control unit 20.

Further, data stored in the data storage unit is the number of divisions of the driving signal and the ON times and OFF times of the multiple switching pulses; or the number of divisions of the driving signal, ON duties of the ON times of the multiple switching pulses for the ON time of the driving signal, and OFF duties of the OFF times of the multiple switching pulses for the ON time of the driving signal. If the number of driving signals Sa1 is relatively small, the ON and OFF timings of the short-circuit unit 30 can be identified by using this data, and therefore an increase in cost associated with improvement in the control unit 20 is not caused.

Alternatively, data stored in the data storage unit is data in the form of functions expressing the ON times and OFF times of the multiple switching pulses on the basis of the numbers of the multiple switching pulses. Even if the number of switching times increases, the ON and OFF timings of the short-circuit unit 30 can be identified by using this data; and because the number of control parameters to be stored in the data storage unit 23c is small, an expensive memory need not be used. The time and load required for reliability verification or evaluation of the data can be reduced so that an increase in device cost is not caused.

Alternatively, data stored in the data storage unit is data in the form of quadratic or higher-degree approximate expressions expressing the ON times and OFF times of the multiple switching pulses. Even if the number of switching times increases, the ON and OFF timings of the short-circuit unit 30 can be identified by using this data; and in addition because control parameters to be stored in the data storage unit 23c can be further reduced in number, the time and load required for reliability verification or evaluation of the data can be much more reduced.

Alternatively, in data stored in the data storage unit, the change rate of the OFF times of the multiple switching pulses is greater than that of the ON times of the multiple switching pulses. Also in the case of using data having the tendency of changes over time as above, the same effect can be produced as in the case of using data in the form of quadratic or higher-degree approximate expressions.

Alternatively, data stored in the data storage unit is data in the form of functions expressing ON duties of the ON times of the multiple switching pulses for the ON time of the driving signal and OFF duties of the OFF times of the multiple switching pulses for the ON time of the driving signal associated with the numbers of the multiple switching pulses. By using such data, even if the number of switching times increases, the ON and OFF timings of the short-circuit unit 30 can be identified by using this data, and further because the number of control parameters to be stored in the data storage unit 23c is small, an expensive memory need not be used. Thus, the time and load required for reliability verification or evaluation of the data can be reduced, and therefore the cost does not increase.

Alternatively, data stored in the data storage unit is data in the form of quadratic or higher-degree approximate expressions expressing the ON duties and OFF duties of the multiple switching pulses. By using such data, even if the number of switching times increases, the ON and OFF timings of the short-circuit unit 30 can be identified, and because control parameters to be stored in the data storage unit 23c can be further reduced in number, and therefore the time and load required for reliability verification or evaluation of the data can be greatly reduced.

Alternatively, in data stored in the data storage unit, the change rate of the OFF duties of the multiple switching pulses is greater than that of the ON duties of the multiple switching pulses. Also in the case of using data having the tendency of changes over time as above, the same effect can be produced as in the case of using data in the form of quadratic or higher-degree approximate expressions.

Alternatively, in data stored in the data storage unit, the ON time of the first switching pulse in a pulse train of the multiple switching pulses is longer than the ON times of the second and subsequent switching pulses. The number of switching times of driving signals Sa1 is reduced by using this data as compared with the case where the ON time of the first switching pulse is set to be of the same value as the ON times of the second and subsequent switching pulses, and therefore the suppression of increase in temperature and reduction in noise are possible because element loss is suppressed.

Alternatively, as to data stored in the data storage unit, ON duties of the ON times of the multiple switching pulses for the ON time of the driving signal and OFF duties of the OFF times of the multiple switching pulses for the ON time of the driving signal, or the ON times and OFF times of the multiple switching pulses are set, such that the power supply current is within the range from an upper-limit threshold to a lower-limit threshold lower than the upper-limit threshold during a period shorter than the half cycle of the AC power supply. With this configuration, the DC output voltage Vdc can be boosted while the peaks of the power supply current Is is suppressed. Further, since the peaks of the power supply current Is can be suppressed, the distortion of the power supply current Is when the short-circuit unit 30 is on can be suppressed, and thus harmonic components can be suppressed. Further, since the peaks of the power supply current Is can be suppressed, the flow-through period of the power supply current Is can be extended, and therefore the power factor can be improved. Further, since the peaks of the power supply current Is can be suppressed, increase in the capacity of a filter circuit and the other components forming the AC power supply 1 can be suppressed, and therefore increase in cost can be suppressed.

Further, the power converting device comprises the current detecting means that detects the power supply current; and the pulse dividing unit corrects ON duties of the ON times of the multiple switching pulses for the ON time of the driving signal and OFF duties of the OFF times of the multiple switching pulses for the ON time of the driving signal, or the ON times and OFF times of the multiple switching pulses on the basis of the power supply current detected by the current detecting means in dividing the driving signal into multiple switching pulses by the processing using software. With this configuration, accuracy of the ON and OFF times of the driving signals Sa1 can be raised.

The configuration described in the above embodiment describes an example of the content of the present invention and can be combined with other publicly known techniques, and parts of the configuration can be omitted or changed without departing from the spirit of the invention.

REFERENCE SIGNS LIST

1 AC power supply
2 Reactor
3 Rectifying circuit
4 Smoothing capacitor
5 DC voltage detector
6 Power supply voltage detector
7 Current detector
8 Current detecting element
9 Current detecting means
10 Load
20 Control unit
21 Driving-signal generating unit
22 Pulse transmission unit
23 Pulse dividing unit
23a First pulse dividing unit
23b Second pulse dividing unit
23c Data storage unit
23d Selector
30 Short-circuit unit
31 Diode bridge
32 Short-circuit element
100 Power converting device.

The invention claimed is:

1. A power converting device comprising:
a rectifier circuit that converts alternating-current power from an alternating-current power supply into direct-current power;
a short-circuit unit that short-circuits the alternating-current power supply via a reactor connected between the alternating-current power supply and the rectifier circuit; and
a control unit that controls an ON/OFF operation of the short-circuit unit during a half cycle of the alternating-current power supply, wherein
the control unit includes:
a driving-signal generating unit that generates a driving signal that is a switching pulse for controlling the ON/OFF operation of the short-circuit unit; and
a pulse dividing unit that divides the driving signal into a plurality of switching pulses so that peak values of power supply current of the alternating-current power supply are within the range from an upper-limit threshold to a lower-limit threshold lower than the upper-limit threshold.

2. The power converting device according to claim 1, wherein
the pulse dividing unit includes:
a data storage unit that stores data used during dividing the driving signal into a plurality of switching pulses; and
a first pulse dividing unit that divides the driving signal into a plurality of switching pulses on the basis of the data stored in the data storage unit.

3. The power converting device according to claim 1, wherein
the pulse dividing unit includes:
a second pulse dividing unit that divides the driving signal into a plurality of switching pulses; so that peak values of the power supply current are within the range from an upper-limit threshold to a lower-limit threshold lower than the upper-limit threshold.

4. The power converting device according to claim 1, wherein the pulse dividing unit comprises:
a data storage unit that stores data used during dividing the driving signal into a plurality of switching pulses;
a first pulse dividing unit;
a second pulse dividing unit that divides the driving signal into a plurality of switching pulses so that peak values of the power supply current of the alternating-current power supply are within the range from an upper-limit threshold to a lower-limit threshold lower than the upper-limit threshold; and a selector that selects the switching pulses from the first pulse dividing unit or the switching pulses from the second pulse dividing unit so as to output.

5. The power converting device according to claim 2, wherein
the data stored in the data storage unit includes the number of divisions of the driving signal, ON times of the plurality of switching pulses, and OFF times of the plurality of switching pulses.

6. The power converting device according to claim 2, wherein
the data stored in the data storage unit includes
the number of divisions for the driving signal,
ON duties of ON times of the plurality of switching pulses for an ON time of the driving signal, and
OFF duties of OFF times of the plurality of switching pulses for an ON time of the driving signal.

7. The power converting device according to claim 2, wherein
the data stored in the data storage unit is data in the form of functions expressing ON times and OFF times of the plurality of switching pulses on the basis of identifying numbers of switching pulses in the plurality of switching pulses.

8. The power converting device according to claim 7, wherein
the data stored in the data storage unit is data in the form of quadratic or higher-degree approximate expressions expressing the ON times and OFF times of the plurality of switching pulses.

9. The power converting device according to claim 8, wherein
the data stored in the data storage unit is data in which a change rate of the OFF times of the plurality of switching pulses is greater than a change rate of the ON times of the plurality of switching pulses.

10. The power converting device according to claim 2, wherein
the data stored in the data storage unit is data in the form of functions expressing ON duties of ON times of the plurality of switching pulses for an ON time of the driving signal and OFF duties of OFF times of the plurality of switching pulses for the ON time of the driving signal associated with identifying numbers of switching pulses in the plurality of switching pulses.

11. The power converting device according to claim 10, wherein
the data stored in the data storage unit is data in the form of quadratic or higher-degree approximate expressions expressing the ON duties and OFF duties of the plurality of switching pulses.

12. The power converting device according to claim 11, wherein
the data stored in the data storage unit is data in which a change rate of the OFF duties of the plurality of switching pulses is greater than that of the ON duties of the plurality of switching pulses.

13. The power converting device according to claim 2, wherein
the data stored in the data storage unit is data in which an ON time of a first switching pulse in a pulse train of a plurality of switching pulses is longer than the ON times of the second and subsequent switching pulses.

14. The power converting device according to claim 2, wherein
the data stored in the data storage unit is data in which ON duties of ON times of the plurality of switching pulses for the ON time of the driving signal and in which OFF duties of OFF times of the plurality of switching pulses for the ON time of the driving signal are set or the ON times and OFF times of the plurality of switching pulses are set such that power supply current of the alternating-current power supply is within the range from an upper-limit threshold to a lower-limit threshold that is lower than the upper-limit threshold during a period shorter than a half cycle of the alternating-current power supply.

15. The power converting device according to claim 2, comprising:
a current detecting means that detects power supply current of the alternating-current power supply,
wherein the first pulse dividing unit, during dividing of the driving signal into a plurality of switching pulses, corrects ON duties of ON times of the plurality of switching pulses for the ON time of the driving signal and OFF duties of OFF times of the plurality of switching pulses for the ON time of the driving signal or corrects the ON times and OFF times of the plurality of switching pulses on a basis of the power supply current detected by the current detecting means.

16. The power converting device according to claim 1, wherein
the control unit is constituted by a microcomputer.

17. The power converting device according to claim 4, wherein
the data stored in the data storage unit includes the number of divisions of the driving signal, ON times of the plurality of switching pulses, and OFF times of the plurality of switching pulses.

18. The power converting device according to claim 4, wherein
the data stored in the data storage unit includes
the number of divisions for the driving signal,
ON duties of ON times of the plurality of switching pulses for an ON time of the driving signal, and
OFF duties of OFF times of the plurality of switching pulses for an ON time of the driving signal.

19. The power converting device according to claim 4, wherein
the data stored in the data storage unit is data in the form of functions expressing ON times and OFF times of the plurality of switching pulses on the basis of identifying numbers of switching pulses in the plurality of switching pulses.

20. The power converting device according to claim 19, wherein
the data stored in the data storage unit is data in the form of quadratic or higher-degree approximate expressions expressing the ON times and OFF times of the plurality of switching pulses.

21. The power converting device according to claim 20, wherein
the data stored in the data storage unit is data in which a change rate of the OFF times of the plurality of switching pulses is greater than a change rate of the ON times of the plurality of switching pulses.

22. The power converting device according to claim 4, wherein
the data stored in the data storage unit is data in the form of functions expressing ON duties of ON times of the plurality of switching pulses for an ON time of the driving signal and OFF duties of OFF times of the plurality of switching pulses for the ON time of the driving signal associated with identifying numbers of switching pulses in the plurality of switching pulses.

23. The power converting device according to claim 22, wherein
the data stored in the data storage unit is data in the form of quadratic or higher-degree approximate expressions expressing the ON duties and OFF duties of the plurality of switching pulses.

24. The power converting device according to claim 23, wherein
the data stored in the data storage unit is data in which a change rate of the OFF duties of the plurality of switching pulses is greater than that of the ON duties of the plurality of switching pulses.

25. The power converting device according to claim 4, wherein
the data stored in the data storage unit is data in which an ON time of a first switching pulse in a pulse train of a plurality of switching pulses is longer than the ON times of the second and subsequent switching pulses.

26. The power converting device according to claim 4, wherein
the data stored in the data storage unit is data in which ON duties of ON times of the plurality of switching pulses for the ON time of the driving signal and in which OFF duties of OFF times of the plurality of switching pulses for the ON time of the driving signal are set or the ON times and OFF times of the plurality of switching pulses are set such that power supply current of the alternating-current power supply is within the range from an upper-limit threshold to a lower-limit threshold that is lower than the upper-limit threshold during a period shorter than a half cycle of the alternating-current power supply.

27. The power converting device according to claim 4, comprising:
a current detecting means that detects power supply current of the alternating-current power supply,
wherein the first pulse dividing unit, during dividing of the driving signal into a plurality of switching pulses, corrects ON duties of ON times of the plurality of switching pulses for the ON time of the driving signal and OFF duties of OFF times of the plurality of switching pulses for the ON time of the driving signal or corrects the ON times and OFF times of the plurality of switching pulses on a basis of the power supply current detected by the current detecting means.

* * * * *